United States Patent [19]

Hamatani

[11] 4,366,978

[45] Jan. 4, 1983

[54] LOCKING MEANS FOR A FORWARDLY FOLDABLE SEAT BACK

[75] Inventor: Teruo Hamatani, Hiroshima, Japan

[73] Assignee: Toyo Kogyo Co., Ltd., Hiroshima, Japan

[21] Appl. No.: 243,716

[22] Filed: Mar. 16, 1981

[30] Foreign Application Priority Data

Mar. 20, 1980 [JP] Japan .............................. 55-36014[U]

[51] Int. Cl.³ ............................................. B60N 1/02
[52] U.S. Cl. .................................... 296/68; 296/37.16
[58] Field of Search ............... 296/68, 37.16; 280/802

[56] References Cited

U.S. PATENT DOCUMENTS 1,648,205 11/1927 Vanier .................................... 296/68
3,817,571 6/1974 Horvat et al. ........................ 296/68

Primary Examiner—Robert R. Song
Attorney, Agent, or Firm—Fleit & Jacobson

[57] ABSTRACT

An automobile has an operable rear panel such as a rear trunk lid or a back door. A rear seat assembly has a rear seat back which is forwardly foldable to provide an increased package space. A locking mechanism is provided for holding the seat back in the upright position. The locking mechanism can be unlocked by moving the rear panel beyond an open position.

5 Claims, 5 Drawing Figures

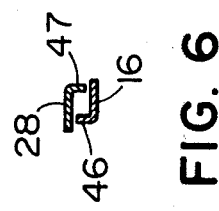
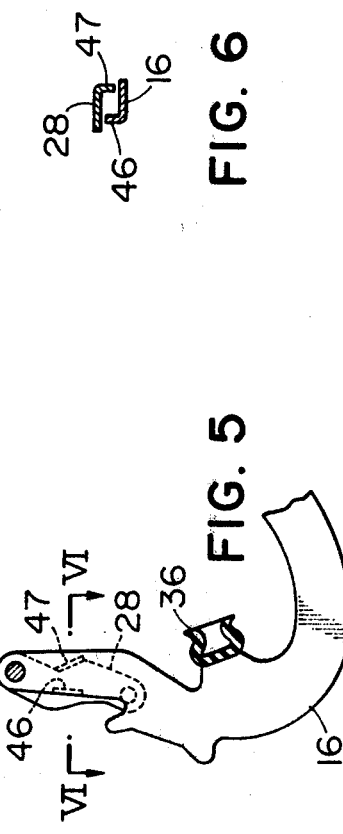
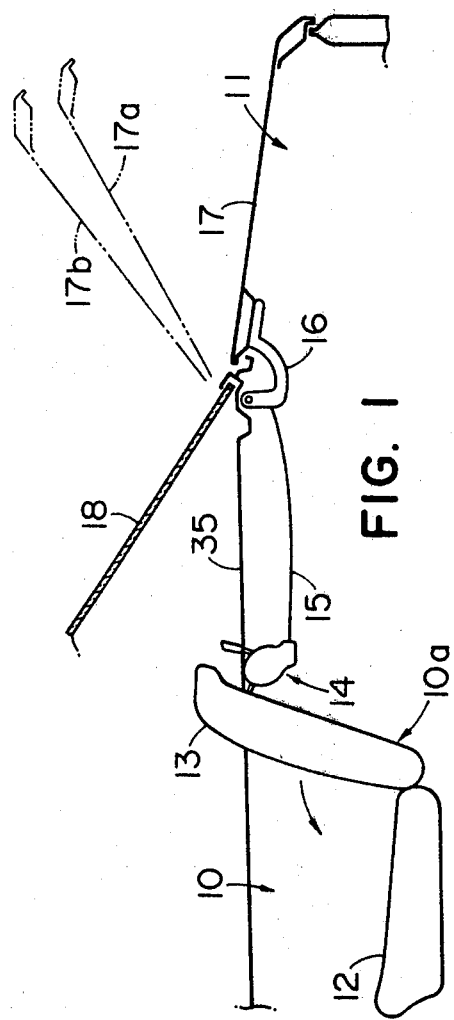
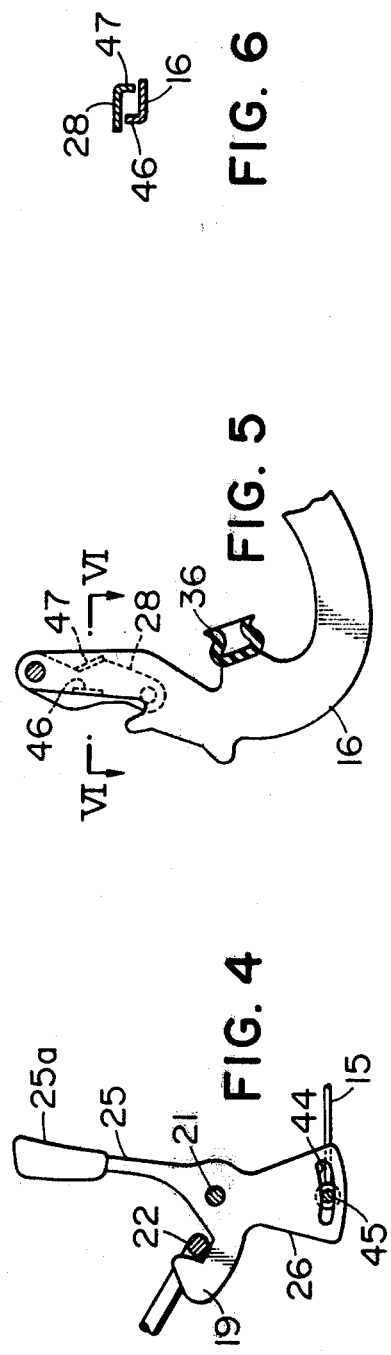

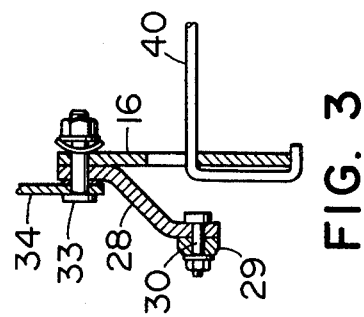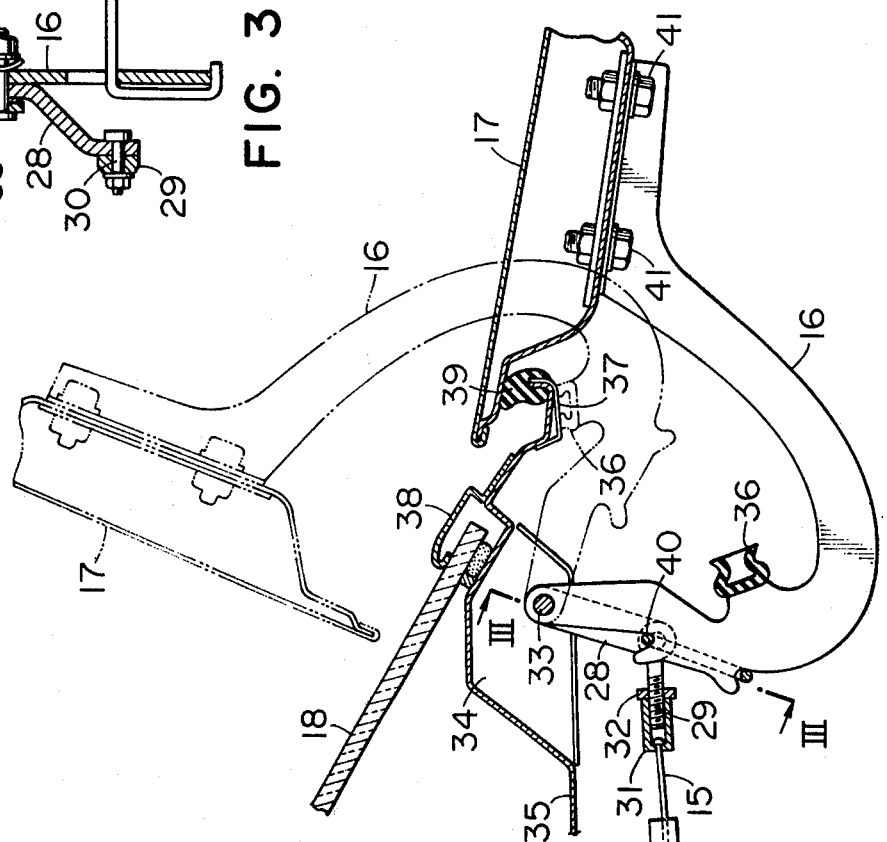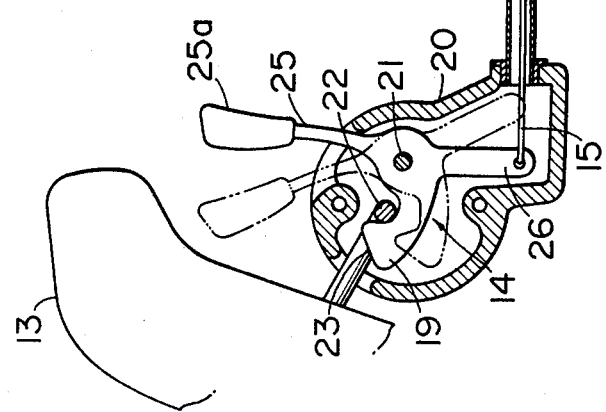

LOCKING MEANS FOR A FORWARDLY FOLDABLE SEAT BACK

The present invention relates to automobiles having operable rear panel assemblies such as rear trunk lids and rear doors. More particularly, the present invention pertains to seat back locking mechanisms for rear seats in such automobiles.

Conventionally, automobiles having rear package spaces often include rear seats with seat backs which are forwardly foldable so that the package spaces can be enlarged when required. The seat backs are provided with locking mechanisms for securely holding them in upright positions and it is always necessary to have the seat backs unlocked in order that the seat backs are folded forwardly. Usually, the rear panel assembly is at first opened by a person who is standing at the backside of the automobile and, when the package space is found insufficient, the seat back is unlocked and folded forwardly. For the purpose, the person has to walk into the rear passenger seat to actuate the locking mechanism. In order to avoid the inconveniency, Japanese utility model application No. 52-115467 which has been disclosed for public inspection on Mar. 19, 1979 under the disclosure No. 54-41022 proposes to provide an unlocking knob at the rear end portion of the automobile body. The knob is located in the lower peripheral edge portion of the opening for the panel assembly and connected with a movable member of the locking mechanism through a cable. Thus, the operator can handle both the panel assembly and the unlocking knob at the same position. It should however be noted that the proposed mechanism is still inconvenient to handle because the operator is required to actuate two different elements.

It is therefore an object of the present invention to provide an automobile having an operable rear door assembly and a forwardly foldable rear seat back with a locking mechanism which can be unlocked by actuating the rear door assembly.

Another object of the present invention is to provide a rear seat back unlocking mechanism for an automobile having an operable rear panel, which is simple and convenient for actuation.

According to the present invention, the above and other objects can be accomplished by an automobile including a body having a rear panel connected with said body through hinge means so that it is moved between a closed and open positions and further to an unlocking position which is beyond the open position, rear seat means having rear seat back means foldable forwardly from an upright position, locking means for locking said rear seat back means in said upright position, said locking means including unlocking means which is connected with said rear panel so that said locking means is actuated to an unlocking position when the rear panel is moved beyond the open position to the unlocking position. Dual stop means may be provided for yieldably stopping the rear panel at the open position and for stopping it at the unlocking position.

The unlocking means may include cable means for connecting the locking means with the rear panel through lost-motion means. For the purpose, the cable means may have an unlocking cable which is appropriately slackened when the rear panel is in the closed position but stretched in the open position of the rear panel. Alternatively, a specific lost-motion mechanism may be provided at either end of the cable means. For example, the cable means may be connected with the locking means through a pin-and-slot connection. Other suitable mechanism may of course be employed.

The above and other objects and features of the present invention will become apparent from the following descriptions of preferred embodiments taking reference to the accompanying drawings, in which:

FIG. 1 is a schematic drawing showing one embodiment of the present invention;

FIG. 2 is a sectional view showing in detail the structure shown in FIG. 1;

FIG. 3 is a sectional view taken substantially along the line III—III in FIG. 2;

FIG. 4 is a side view showing an embodiment adopting a lost-motion mechanism;

FIG. 5 is a side view of a panel hinge bracket having a lost-motion mechanism; and, FIG. 6 is a sectional view taken substantially along the line VI—VI in FIG. 5.

Referring now to the drawings, particularly to FIG. 1, there is schematically shown a rear part of an automobile including a rear passenger space 10 provided with a rear seat 10a and a rear package space 11 provided rearwards of the rear seat 10a. The rear seat 10a includes a rear seat cushion 12 and rear seat back 13 which can be folded from the upright position forwardly as shown by an arrow in FIG. 1. In order to releasably hold the rear seat back 13 in the upright position shown in FIG. 1, there is shown a locking mechanism 14. The rear package space 11 is covered by a rear trunk lid 17 which is connected at the front edge portion thereof with the automobile body through hinge brackets 16. The locking mechanism 14 is connected through an unlocking cable 15 with one of the hinge brackets 16 so that it can be actuated by the lid 17. In the illustrated embodiment, a rear package tray 35 is provided between the rear seat 10a and a rear transparent glass 18 so that small packages can be put thereon.

Referring now to FIG. 2, it will be noted that the locking mechanism 14 includes a casing 20 which houses a locking hook member 19 rotatably mounted on the casing 20 through a shaft 21. Although not shown in FIG. 2, the locking mechanism 14 includes a spring for biasing the hook member clockwise as seen in the plane of the drawing. The rear seat back 13 is provided at the back side thereof with a striker 22 and the hook member 19 is formed at the front end with a cam surface 23 so that it is engaged with the striker 22 when the rear seat back 13 is moved to the upright position and the hook member 19 is rotated counter-clockwise against the action of the biasing spring to thereby place the striker 22 into the locking engagement with the hook member 19. The hook member 19 is integrally formed with an actuating arm 25 which extends outwardly from the casing 20 and is provided with an actuating handle 25a at the outer end thereof. Thus, the hook member 19 can be moved to an unlocking position by actuating the arm 25 and the handle 25a to the position shown by phantom lines in FIG. 2.

The hook member 19 is further formed with a downward extension 26 which has an end portion connected with the front end of the cable 15. The hinge bracket 16 which is connected with the lid 17 through bolts 41 is swingably connected through a hinge pin 33 with a stationary hinge bracket 34 secured to the rear package tray 35 which constitutes a portion of the automobile body. An actuating lever 28 is attached to the hinge bracket 16 so that it can be swung as a unit with the bracket 16. As shown in FIGS. 2 and 3, the lever 28 has a lower end connected with a screw member 29 by means of a bolt 30. The screw member 29 is in engagement with an internally threaded sleeve 31 which is in turn connected with the rear end of the cable 15. A sheath or outer case 27 may be provided to cover the cable 15 and is secured by a locknut 32. The body may be provided with fairings 38 and seal members 39 as desired and a stop bracket 37 is attached to the body for limiting the stroke of the trunk lid 17. For cooperation with the stop bracket 37, the hinge bracket 16 on the lid 17 is provided with a dual stopper 36 which engages the stop bracket 37 when the lid 17 is opened to the open position shown by 17a in FIG. 1 but is further deformable to allow the lid 17 to move further to the position shown by 17b in FIG. 1. The cable 15 is normally slackened when the lid 17 is in the closed position but can be stretched when the lid is moved to the open position 17a. When the lid is moved further to the position 17b, the cable actuates the hook member 19 to release the striker 22 so that the rear seat back 13 is folded down forwardly. As shown in FIGS. 2 and 3, the hinge bracket 16 may be provided with a torsion spring 40 for biasing the lid 17 to a partially open position.

Referring now to FIG. 4, there is shown another embodiment in which the extension 26 of the hook member 19 is formed with an arcuate slot 44 and the cable 15 is connected with the member 19 by means of a pin 45 engaged with the slot 44. When the lid 17 is moved from the closed position to the open position, the pin 45 moves along the slot 44 so that the hook member 19 is maintained in the locking position. A further movement of the lid 17 causes the cable 15 to pull the hook member 19 to the unlocking position.

In FIGS. 5 and 6, there is shown a further embodiment of the present invention. In this embodiment, the lever 28 is movable with respect to the hinge bracket 16. A lug 46 is formed on the hinge bracket 16 and a cooperating lug 47 is formed on the lever 28. When the lid 17 is in the closed position, the lugs 46 and 47 are spaced apart as shown in FIG. 6. As the lid 17 is moved to the open position, the lug 46 is moved toward the lug 47 and engages therewith in the open position of the lid 17. When the lid 17 is moved further upwards beyond the open position, the lever 28 is swung and a pulling force is applied to the cable to thereby move the hook member 19 to the unlocking position.

The invention has thus been shown and described with reference to specific embodiments, however, it should be noted that the invention is in no way limited to the details of the illustrated structures but changes and modifications may be made without departing from the scope of the appended claims. For example, although the invention has been shown and described with reference to an automobile having a rear trunk lid, it can also be applied to a structure having a rear or back door such as a lift back type or wagon type cars.

I claim:

1. An automobile including a body having a rear panel connected with said body through hinge means so that it is moved between a closed and open positions and further to an unlocking position which is beyond the open position, rear seat means having rear seat back means foldable forwardly from an upright position, locking means for locking said rear seat back means in said upright position, said locking means including unlocking means which is connected with said rear panel so that said locking means is actuated to an unlocking position when the rear panel is moved beyond the open position to the unlocking position.

2. An automobile in accordance with claim 1 which includes dual stop means for yieldably stopping the rear panel at the open position and for stopping it at the unlocking position.

3. An automobile in accordance with claim 1 in which said unlocking means includes cable means for connecting the locking means with the rear panel through lost-motion means.

4. An automobile in accordance with claim 3 in which said lost-motion means is constituted by providing said cable means with an unlocking cable which is appropriately slackened when the rear panel is in the closed position but stretched in the open position of the rear panel.

5. An automobile in accordance with claim 3 in which said lost-motion means includes a lost-motion mechanism provided in at least one end of the cable means.

* * * * *